Patented Sept. 6, 1927.

1,641,281

UNITED STATES PATENT OFFICE.

PAUL LUEG, OF LEVERKUSEN, JULIUS DRUCKER, OF COLOGNE-MUHLHEIM, AND HEINZ THIENEMANN, OF LEVERKUSEN, NEAR COLOGNE, GERMANY, ASSIGNORS TO I. G. FARBENINDUSTRIE AKTIENGESELLSCHAFT, OF FRANKFORT-ON-THE-MAIN, GERMANY.

PROCESS FOR PRODUCING ACTIVE CARBON.

No Drawing. Application filed November 7, 1925, Serial No. 67,656, and in Germany April 29, 1925.

Several methods for the manufacture of highly active carbon have already been suggested depending on the treatment of wood, peat, lignite and similar materials with steam at a red heat. According to our experience this mode of activation by means of steam results however in only very small yields of active material.

The application of the present invention ensures a yield which is considerably increased and the carbon produced is of superior activity. Our new process consists in a suitable preliminary treatment of the starting materials, as for example wood, peat, lignite and the like, by impregnation with sulphuric acid, the concentration of which may vary within wide limits in conjunction with gentle heating to a glowing temperature (low red heat).

Our process lends itself with advantage to a method of continous working, in which steam is brought into contact with the preliminary activated material if necessary with increase of temperature, without transference of the charge.

The following example will serve to illustrate our process more fully:

200 parts by weight of peat are treated with 450 parts by weight of 50% sulphuric acid, the homogeneous mass thus produced is made into any desired shapes in any convenient manner and heated in a shaft furnace, revolving furnace or similiar apparatus to about 750° C. The sulphuric acid is thereby converted into sulphur dioxide, which escapes with the fuel gases from which the same may be recovered. The carbon simultaneously produced is further heated to about 900° C. whilst steam is conducted through the apparatus. A highly active form of carbon results from the treatment as outlined above and the yield amounts to about three times the amount of activated carbon compared with that obtained by previously known processes.

The process equally is applicable in the preparation of active carbon from other similar cellulosic carbonaceous materials. The expression "cellulosic carbonaceous materials" is intended to include all natural products consisting of cellulose and/or lignocellulose, such as for example wood, peat, lignite and the like.

The proportions given and the mode of working can, of course, be varied within very wide limits and we desire it to be understood, that we do not restrict ourselves to the above example.

We claim:

1. Process for the production of active carbon which comprises treating cellulosic carbonaceous material with sulfuric acid at temperatures above 300° C. and subsequently subjecting the material to steam activation.

2. Process for the production of active carbon as defined in claim 1 in which the steam activation immediately follows the sulfuric acid treatment.

3. Process for the production of active carbon as defined in claim 1, in which the carbonaceous material is peat.

In testimony whereof we have hereunto set our hands.

PAUL LUEG,
JULIUS DRUCKER,
HEINZ THIENEMANN.